UNITED STATES PATENT OFFICE 2,599,375

2,4,6-TRICHLOROPHENYL DIALKYL-PHOSPHATES

Lewis R. Drake, Midland, and Arthur J. Erbel, Bay City, Mich.

No Drawing. Application April 21, 1950, Serial No. 157,412

3 Claims. (Cl. 260—461)

This invention is directed to the 2,4,6-trichlorophenyl dialkyl phosphates having the formula

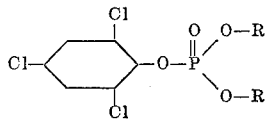

wherein R represents a methyl or ethyl radical. These new compounds are crystalline solids, somewhat soluble in many organic solvents, and substantially insoluble in water. They are of value as toxic constituents of parasiticide compositions.

The new compounds may be prepared by reacting 2,4,6-trichlorophenyl dichlorophosphate of the formula

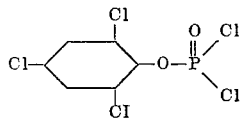

with methanol or ethanol.

In carrying out the reaction, at least 2 molecular proportions of methanol or ethanol and at least 2 molecular proportions of pyridine are dissolved in benzene, methylene dichloride, diethyl ether, or other suitable solvent, and the resulting solution added portionwise to 1 molecular proportion of 2,4,6-trichlorophenyl dichlorophosphate dissolved in the same solvent. The reaction is carried out with stirring and at a temperature of from 20° to 45° C. Upon completion of the reaction, the crude reaction mixture may be washed with water and dried. The separation of the desired product is then accomplished by evaporation of the solvent.

2,4,6-trichlorophenyl dichlorophosphate, employed as a starting material, as above described, may be prepared by reacting 2,4,6-trichlorophenol with phosphorus oxychloride (POCl₃) in a molecular excess of pyridine. In carrying out the reaction, 1 molecular proportion of 2,4,6-trichlorophenol is dissolved in at least 1 molecular proportion of pyridine, and the resulting solution added portionwise to 5 molecular proportions of phosphorus oxychloride. The addition is carried out with stirring and at a temperature of from 25 to 100° C. In practice, it is sometimes convenient to operate at the boiling temperature of the reaction mixture and under reflux. A mixture of pyridine and an inert solvent such as methylene dichloride may be substituted for the excess pyridine, provided only that at least 1 molecular proportion of pyridine be present for each molecular proportion of 2,4,6-trichlorophenol present in the mixture. Upon completion of the reaction, the crude mixture is fractionally distilled under reduced pressure to obtain the 2,4,6-trichlorophenyl dichlorophosphate as a crystalline solid melting at 72° to 75° C.

The following examples illustrate the invention but are not to be construed as limiting:

*Example 1.—2,4,6-trichlorophenyl dimethyl phosphate*

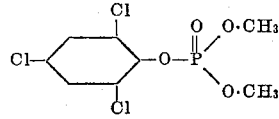

6.4 grams (0.2 mole) of methanol and 15.8 grams (0.2 mole) of pyridine were dissolved in 50 milliliters of petroleum ether (boiling at 60–70° C.) and the resulting solution added portionwise with stirring to 31.45 grams (0.1 mole) of 2,4,6-trichlorophenyl dichlorophosphate dispersed in 100 milliliters of petroleum ether. The addition was carried out over a period of ½ hour and at a temperature of from 20–35° C. The reaction vessel and content were then cooled to room temperature, and the crude mixture washed with water and dried with anhydrous calcium chloride. The solvent was then removed by evaporation to obtain 2,4,6-trichlorophenyl dimethyl phosphate as a crystalline solid melting at 69–71° C.

*Example 2.—2,4,6-trichlorophenyl diethyl phosphate*

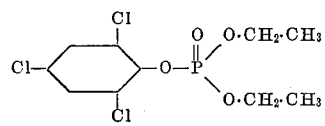

46 grams (1 mole) of ethanol and 7.9 grams (0.1 mole) of pyridine were dissolved in 50 milliliters of petroleum ether and the resulting solution added portionwise with stirring to 16 grams (0.05 mole) of 2,4,6-trichlorophenyl dichlorophosphate dissolved in 50 milliliters of petroleum ether. The addition was carried out over a period of ½ hour and at a temperature of from 20–35° C. The reaction vessel and content were then cooled to room temperature, and the crude mixture washed with water and dried with anhydrous calcium chloride. The solvent was then removed by evaporation to obtain 2,4,6-trichlorophenyl diethyl phosphate as a crystalline solid melting at 40–41° C.

The new 2,4,6-trichlorophenyl dialkyl phosphates have been found effective as parasiticides and are adapted to be employed for the control of agricultural and household pests. For such use the products may be dispersed on an inert finely divided solid and employed as dusts. Also, such mixtures may be dispersed in water with the aid of a wetting agent, and the resulting aqueous suspensions employed as sprays. In other procedures, the products may be employed in oils, or in water dispersions with or without the addition of wetting agents.

We claim:

1. A 2,4,6-trichlorophenyl dialkyl phosphate having the formula

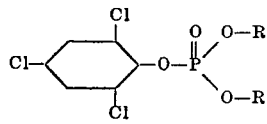

wherein R represents a member of the group consisting of the methyl and ethyl radicals.

2. 2,4,6-trichlorophenyl dimethyl phosphate.
3. 2,4,6-trichlorophenyl diethyl phosphate.

LEWIS R. DRAKE.
ARTHUR J. ERBEL.

REFERENCES CITED

The following references are of record in the file of this patent:

UNITED STATES PATENTS

| Number | Name | Date |
|---|---|---|
| 2,520,393 | Fletcher | Aug. 29, 1950 |

FOREIGN PATENTS

| Number | Country | Date |
|---|---|---|
| 326,137 | Great Britain | Feb. 28, 1930 |
| 261,807 | Switzerland | Sept. 1, 1949 |